Oct. 18, 1966
F. W. R. STARP ETAL
DEVICE FOR RELEASING A PHOTOGRAPHIC CAMERA AND OBTAINING
EXTRA-LONG EXPOSURE TIMES
3,279,345
Filed Oct. 30, 1964
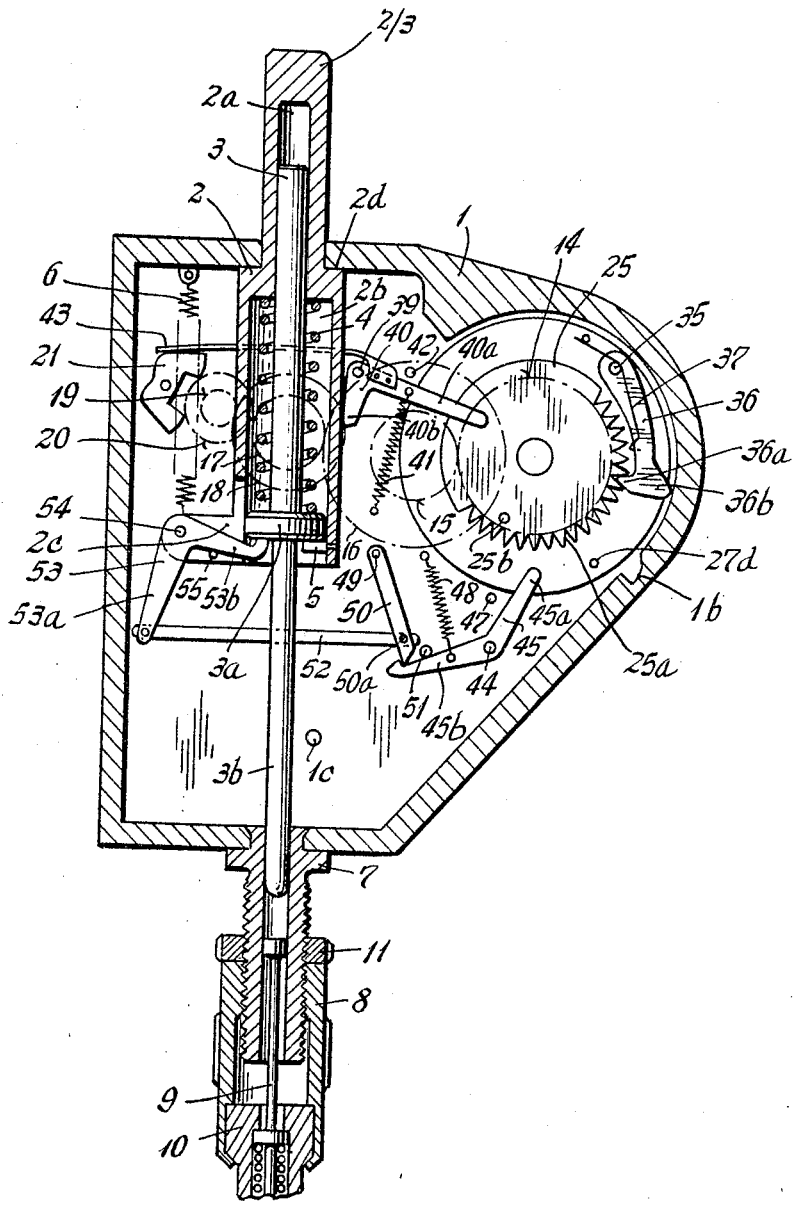
INVENTORS
Franz W. R. Starp
Waldemar S. Racki
BY
Arthur A. March
ATTORNEY

United States Patent Office 3,279,345
Patented Oct. 18, 1966

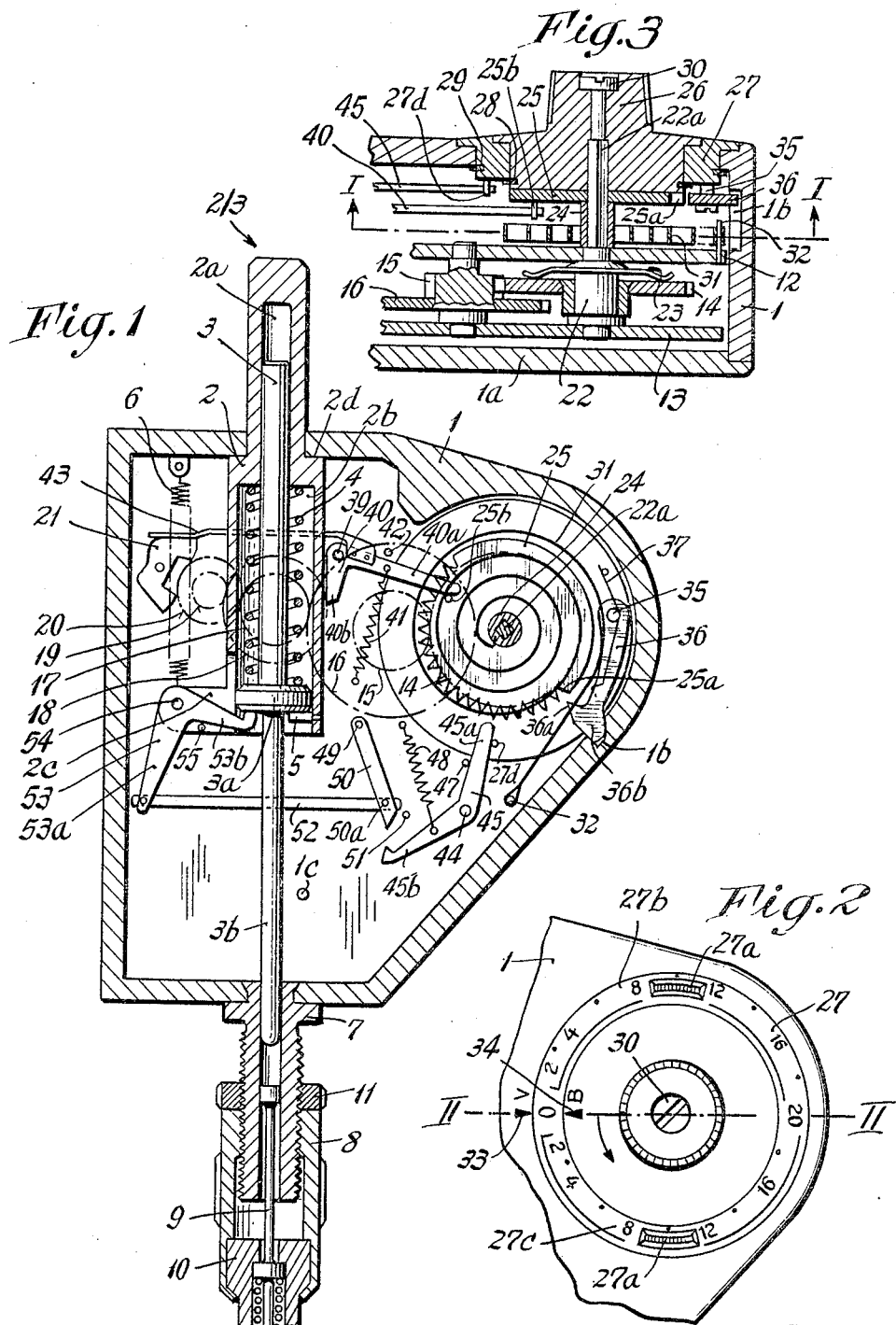

3,279,345
DEVICE FOR RELEASING A PHOTOGRAPHIC CAMERA AND OBTAINING EXTRA-LONG EXPOSURE TIMES
Franz W. R. Starp and Waldemar S. Racki, Calmbach (Enz), Germany, assignors to Alfred Gauthier, G.m.b.H., Calmbach (Enz), Germany, a corporation of Germany
Filed Oct. 30, 1964, Ser. No. 407,921
Claims priority, application Germany, Nov. 2, 1963, G 39,084
10 Claims. (Cl. 95—53.3)

This invention relates to a spring-driven device which can be manually cocked and preset to a selected running time and can be connected to a photographic camera to control, automatically, the time of opening of the camera shutter and the duration of time that the shutter remains open.

Devices operating through the cable release of a camera for automatically controlling the shutter to produce extra-long exposures have been known heretofore. So have delayed action devices that operate through the camera release to delay the opening of the shutter for a certain length of time after the device has been actuated. Delayed action devices which hold the shutter release in a depressed position for a preselected length of time to obtain extra-long exposures have also been known. The present device is generally used for making time-limited exposures in the camera to which the device is attached.

One of the principal objects of the present invention is to provide an improved mechanism operating through the cable release for obtaining either delayed action or extra-long exposures of controlled duration, or both, in the same exposure.

In the present invention the actuating mechanism includes a shutter release which may be arranged as a push button and which includes means to store energy. The shutter release has both a slide and a pin resiliently supported with respect to the slide. A locking device is included in the mechanism and arranged so that it can block alternately the slide or the running mechanism. There is also a positive, or check, guide that can be operatively connected to the pin. This guide includes an arresting lever which is released to assume a locking position when means are actuated to move the cocking shaft of the running mechanism to a specific cocking position and is moved out of the locking position by the same device upon return to the starting position thereof. This makes it possible for a structurally simple mechanism to provide for a greater multiplicity of modes of operation than devices of the prior art.

By virtue of the foregoing mechanism it is possible to make extra-long exposures and to make such exposures after a predetermined delay from the instant that the shutter release is actuated. Alternatively, the delayed action can be utilized alone when the camera is otherwise set to make relatively short exposures. Finally, either long exposures or regular exposures can be carried out without any delay from the time the shutter release is actuated.

In one embodiment, which has been found to be quite satisfactory, the shutter release is in the form of a hollow cylinder that may be slid along its axis and a pin is slidably placed within the hollow cylinder. The pin has a shoulder, or flange, to engage a compression spring and this shoulder also cooperates with a locking mechanism.

The invention also provides for extremely low frictional resistances by virtue of the fact that the positive, or check, guide can be made in the form of a 4-membered joint, or hinge, that can be locked by the arresting lever. One link of the 4-membered joint is an arm of an angle lever rotatably mounted on the slide member of the shutter release in such a way that the arm of this lever engages the collar, or flange, of the pin. The other link, or guide, of the 4-membered joint is a lever mounted on a fixed pivot pin and articulately connected to the angle lever by a connecting rod. The number of parts can be reduced to a minimum by arranging a lever which can be locked by means of an arresting lever, and which comprises a slide, or groove, for positively guiding the angle lever.

A further feature of the invention is that the locking device that alternately blocks the running mechanism or the release slide includes an angle lever pivotally mounted on a fixed pin. One arm of this lever which cooperates with the device that moves the cocking shaft into its cocked position carries an elastic tongue, or blade, which extends into the path of movement of an escapement anchor that forms part of the running mechanism. The other arm of the arresting lever is operatively associated with the slide member of the shutter release. From a functional viewpoint, one advantage of such an arrangement is that it insures an accurate mutual time adjustment of the motions carried out in the mechanism.

A special advantage of the apparatus formed according to the present invention is that the device designed to move the cocking shaft of the running mechanism into its cocked position includes a setting knob that is non-rotatably conected to the cocking shaft of the running mechanism as well as of an adjacent setting ring coaxial with the knob and separately rotatable with respect thereto. The ring and the knob can be coupled in different relative positions. As a result, only one running mechanism is required for obtaining both delayed action and extra-long exposures. In addition, the respective time delay, or exposure delay, can be set directly without the use of additional intermediate members.

In order to assure dependable operation of the coupling between the knob and the ring, the ring may be provided with a rotatable, spring-biased coupling pawl that has a protrusion at one end for engagement with a detent opening in the housing of the apparatus when the setting ring is in its starting position. The setting knob is non-rotatably connected to a coupling disc that has notches with which the pawl can engage.

A satisfactory connection from the operating mechanism to the arresting levers and controlled by the former includes a driving pin associated with the setting knob and cooperating with the arresting lever that blocks the slide member of the shutter release. The setting ring, which can be coupled to the setting knob, has a driving pin operatively associated with the arresting lever of the positive, or check, guide.

In setting the apparatus, use is made of two setting scales, each of which extends over an angular range of approximately 180° from a common origin "0" on the setting ring. One of the scales is for setting the time delay and this is set with respect to a fixed mark. A mark on the setting knob is positioned with respect to the other scale for setting the apparatus for making extra-long exposures.

In addition, it is advantageous to connect the mechanism non-rotatably to the cocking shaft by means of a frictional connection, such as a spring plate, non-rotatably mounted on the cocking shaft. This makes it possible to change a previous setting of the device at any time.

The invention will be described in greater detail in connection with the drawings in which:

FIG. 1 shows a longitudinal, sectional view of the apparatus of the invention in its inoperative position, taken along the line I—I of FIG. 3;

FIG. 2 is a top view of a fragment of the apparatus showing the setting and cocking members;

FIG. 3 is a partial cross-sectional view of the apparatus in FIG. 2 taken along the line II—II with a portion of the running mechanism;

FIG. 4 is a longitudinal cross-sectional view of the apparatus with the components set for a specific time delay and for a specific extra-long exposure;

Figure 5:
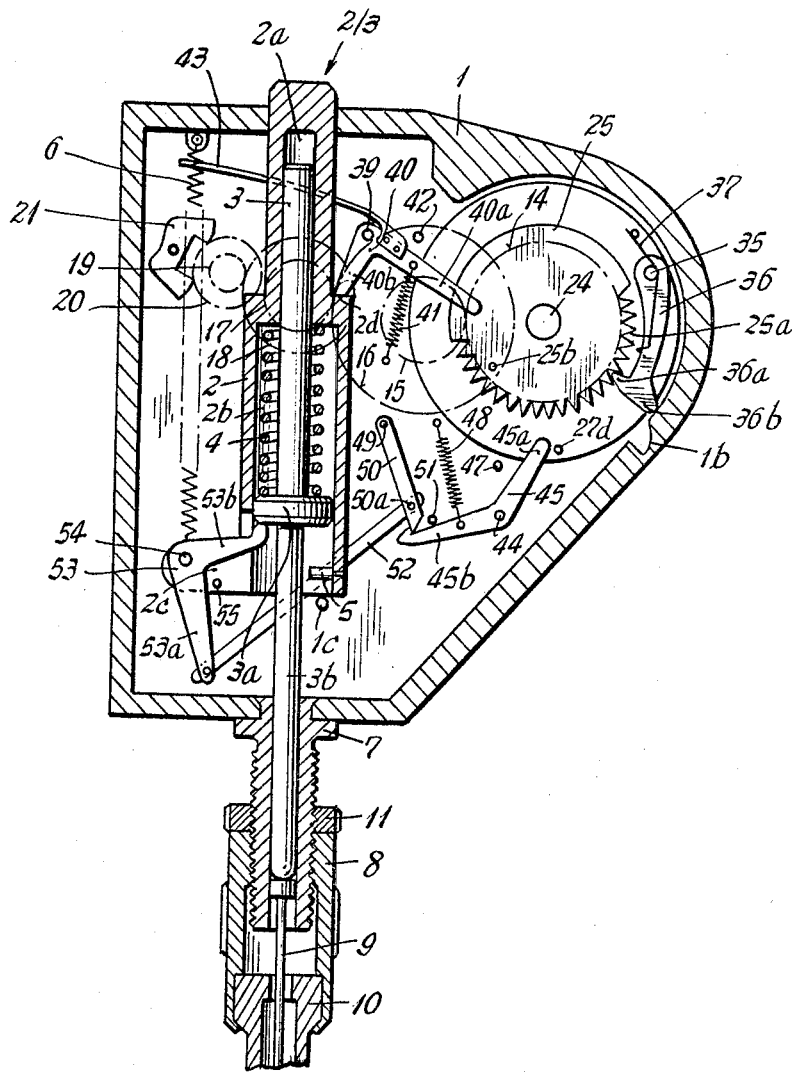
FIG. 5 shows the apparatus in an intermediate position after the shutter release has been actuated.

The drawings show a housing 1 having a removable cover 1a (see FIG. 3) at one side. As is shown in FIG. 1, there is a shutter release divided into a cylindrical slide 2 and a pin 3, one end of which is journaled within a coaxial bore 2a in the slide 2. The pin 3 has a collar, or flange, 3a to engage a compression spring 4, the other end of which bears against the bottom end of an enlarged bore 2b in the slide 2. The flange 3a is held within the bore 2b by a stop 5. The slide 2 and the pin 3 are axially movable both as a unit and separately once the force of the spring 4 has been overcome. A restoring spring 6 is connected between the housing 1 and a projection 2c on the slide 2 to pull the slide toward its starting position in which a shoulder 2d on the slide strikes the inner wall of the housing.

The other end 3b of the pin 3 slides within a bushing 7 attached to the housing to actuate a cable release 10 which has a connecting sleeve 8 and a push rod 9. The sleeve 8 is internally threaded to engage the externally threaded end of the bushing 7. A locknut holds the sleeve 8 in place and keeps it connected to the bushing 7 in the proper position to accommodate the stroke through which the push rod 9 must travel in order to operate the shutter of a particular camera to which it is attached.

FIG. 3 shows two plates 12 and 13 for holding the running mechanism within the housing 1. These plates are parallel to each other and are affixed to the housing. The running mechanism includes a plurality of intermeshing gears 14 to 19 together with an escapement, or ratchet wheel, 20 non-rotatably connected to the gears and controlled by an escapement anchor 21. The gear 14 is freely rotatably mounted on a shaft 22 mounted on the plates 12 and 13, while a spring plate 23 non-rotatably connected to the shaft 22 and supported by the gear 13 with a certain initial stress acts as a friction coupling between the shaft 22 and the gear 14. One section 22a of the shaft 22 has a square cross-section to receive a spacer bushing 24, a coupling disc 25 having notches 25a around half of its circumference, and a setting knob 26 positioned coaxially within a setting ring 27 that is rotatably mounted in the housing 1. Retainer rings 28 and 29 and a locking stud 30 secure the setting members 26 and 27 with respect to each other and with respect to the housing 1.

The force required for operating the mechanism, including the running gear 14–21, is stored in a spiral spring 31, one end of which is hooked onto the spacer bushing 24 non-rotatably connected to the shaft 22, while the other end is attached to a fixed pin 32 on the bearing plate 12. The spiral spring is put under stress when the shaft 22 is rotated in the direction indicated by the arrow in FIG. 2.

In the embodiment illustrated in FIG. 2 the setting member 27 is shown in the form of a ring having roughened projections 27a for manipulation and two setting scales 27b and 27c extending over an angular range of 180° starting from a common origin "0." Scale 27b is intended for setting the device for a specific time delay action time, while the scale 27c is for setting the device for extra-long exposures. The scale 27b is set with respect to a fixed mark 33 on the housing 1. In addition, a mark 34 on the setting knob 26 may be set with respect to the scale 27c. The arrangement of the two scales 27b and 27c shows that mutually independent running times can be obtained with the mechanism 14 to 21 and that, in addition, the device can be set for running times of different duration. For this purpose, the ring 27 has a coupling pawl 36 pivotally mounted on a pin 35 and provided with a spring 37 which keeps the free end of the pawl in engagement with the inner wall of the housing 1. The free end of the pawl 36 has a detent projection 36a and a cam 36b opposite thereto. The pawl is so arranged that the cam 36b fits into an opening 1b in the housing 1 when the setting ring 27 is in the starting position "0" illustrated in FIG. 2. The inner wall of the housing that can be contacted by the pawl 36 is circular and is thus adapted to the shape of the setting ring 27. If the setting ring 27 is rotated counterclockwise from the position shown in FIG. 1, the pawl 36 is pivoted slightly about the pin 35 so that the cam 36b moves out of the opening 1b and into the raised region of the inner wall of the housing, as shown in FIGS. 4 and 5. This rotary motion of the pawl 36 causes the projection 36a to engage one of the arresting knobs 25a on the disc 25, as is also shown in FIGS. 4 and 5. Since the coupling disc 25, which is mounted on the square section 22a of the cocking shaft along with the setting knob 26 has knobs 25a over half of its circumference, the coupling connection between the setting knob and the setting ring 27 can be established in many different relative positions. However, this presupposes that either the setting knob 26 or the coupling disc 25 is rotated to occupy a specific relative position with respect to the setting ring 27 before the latter is actuated. If the setting ring is moved subsequently, the non-rotatable connection between the pawl 36 and the disc 25 is effected automatically in the relative position previously occupied by these members. This means that the setting knob 26 is also rotated along with the setting ring 27 as soon as the projection 36a enters one of the knobs 25a directly opposite the projection. Conversely, the coupling connection is released as soon as the setting ring has reached the starting position "0" illustrated in FIG. 1 because at that point the cam 36b is free to enter the opening 1b which allows the pawl 36 to pivot enough to remove the projection 36a from engagement from the knobs 25a.

A two-armed arresting lever 40 is fixedly positioned on a pivot pin 39 to cooperate with the coupling disc 25 of the knob 26. The disc 25 is non-rotatably attached to the cocking shaft 22. The rotating lever has a comparatively long arm 40a which extends into the path of motion of a driving pin 25b on the disc 25 and a relatively short arm 40b which extends in the direction of motion of the cylindrical slide 2. A spring 41 attached to the arm 40a urges the lever 40 to make the free end of the arm 40b engage the slide 2 as soon as the pin 25b is removed from the arm 40a by rotation of the coupling disc 25. A fixed stop pin 42 is also associated with the arm 40a to act as an end stop and set the starting or end position of the disc 25 or the setting knob 26 or both. A resilient spring blade 43 attached to the arm 40a extends past the slide 2 to cooperate with the escapement anchor 21 of the running down mechanism 14 to 21, as will be described in greater detail hereinafter.

In a manner analogous to the association of the arresting lever 40 with the coupling disc 25, another two-armed arresting lever 45 fixedly attached to the pivot pin 44 is associated with the setting ring 27. The arresting lever 45 has an arm 45a that is pressed against a fixed end stop 47 by means of a driving pin 27d on the setting ring 27 when the latter is in its starting position "0." A spring 48 is attached to the arm 45b and urges the arm toward contact with a link 50 pivotally mounted on a pin 49. However, while the setting ring 27 is in its starting position, the arm 45b cannot reach the link. Clockwise rotary motion of the arresting lever 45 is limited by a stop 51 located in the path of movement of the arm 45b. The free end of the link 50 is articulately connected by means of a coupling rod 52 to a lever arm 53a of an angle lever 53 pivotally mounted on a pin 54 extending from the projection 2c. Kinematically, these members form a 4-membered joint, or hinge, which connects the shutter release 2 and 3 to the setting ring 27. The shape and location of the lever 53 are such that the free end of its other arm 53b engages the flange 3a and an end stop 55 is placed on the projection 2c to limit the rotary motion of the lever 53 in one direction.

In order to make the setting of the device as clear and simple as possible for the photographer, the letter "V" is placed close to the mark 33 to indicate to the photographer that the desired delayed action is to be set at this mark by placing the proper value of the scale 27b. The setting mark 34 on the other hand has a letter "B" located close to it to indicate that in selecting the desired extra-long exposure time the mark 34 must be made to coincide with the corresponding value of scale 27c. It is apparent from the scales 27b and 27c that the mechanism 14 to 21 may have the maximum total running time of 40 sec., 20 sec. on each of the two scales. Proceeding from the assumption that the range of rotation of the two setting members 26 and 27 is limited to 180° by the arrangement of stops, a maximum of 20 sec. delayed action and 20 sec. for exposure would be available. The total running time of the device is always the sum of the delayed action time and the extra-long exposure time. The device may also be equipped with a mechanism having a total running time of another order of magnitude. The device may also be of such a nature that the available extra-long exposure time has a value that corresponds to the difference between the preset delayed action time and the maximal running time of the mechanism, in which case there must be no stops on the setting members.

This device operates in the following manner:

*When used as a cable release*

The device may be used simply as a cable release without affecting the duration of exposure and without adding any time delay. To do so, the cable release 10 must be connected to the camera and the setting members 26 and 27 set at their zero starting positions as illustrated in FIG. 2. When the photographer depresses the shutter release 2 and 3, the cylindrical slide 2 will strike the fixed stop pin 1c in the housing 1 and the end of the pin 3b will actuate the plunger 9 which, in turn, will actuate the shutter of the camera. If the camera is set at its "B" setting position, with which most cameras are provided, its shutter remains open as long as the release push rod 2 and 3 is held depressed. On the other hand, if the camera is set for predetermined relatively short exposure, actuation of the shutter release 2 and 3 will merely initiate the operation of the shutter which will not be effected if the shutter release is held depressed. The spring 4 is stronger than the release force usually required in cameras and therefore this spring is not compressed by this type of operation.

*When used as an extra-long exposure release*

If the device is to be used to obtain exposures of longer duration than those for which the camera shutter makes provision, the mark 34 of the setting knob 26 must be set opposite the desired exposure time value of the scale 27c and the camera shutter must be set for a "B" exposure. The setting of the knob 26 causes the driving pin 25b, which is connected to the knob indirectly by way of the coupling disc 25, to move away from the arresting lever 40, thereby permitting the arresting lever to rotate slightly on the pivot pin 39 in response to the force of the spring 41, which pulls the free end of the arm 40b against the slide 2. Simultaneously, with the rotation of the knob 26, the spiral spring 31 will be wound up by means of the shaft 22. At the same time the cup spring 23 slides along the gear 14 because motion of the latter, and in fact of the mechanism 14 to 21, is blocked by the pressure of the spring blade 43. If the shutter release 2 and 3 is now actuated, this entire push rod will be displaced longitudinally downward with respect to the position illustrated in FIG. 1 and against the force of the restoring spring 6. The downward movement will continue until the arm 40b is free to hook over the shoulder 2d, thereby blocking return of the slide 2 to its upper position.

Simultaneously, the camera shutter will be opened and the mechanism 14 to 21 will be released to run down. This release occurs at the instant that the arresting lever 40 is rotated on the pin 39 far enough to lift the spring blade 43 away from the escapement anchor 21. The cocking shaft 22, which is coupled to the gear 14 by means of the cup spring 23, also rotates during the running down of the mechanism 14 to 21, thereby rotating the setting knob 26 and the coupling disc 25 so that the mark 34 again returns to the starting position. Near the end of the rotary motion, the driving pin 25b strikes the arm 40a and rotates the lever 40 about the pin 39 so as to release the slide 2 and permit it to be returned to its starting position by the restoring spring 6. This is a final indication that the operation of the shutter is complete.

*When used as an extra-long exposure release with delayed action*

Figure 6:
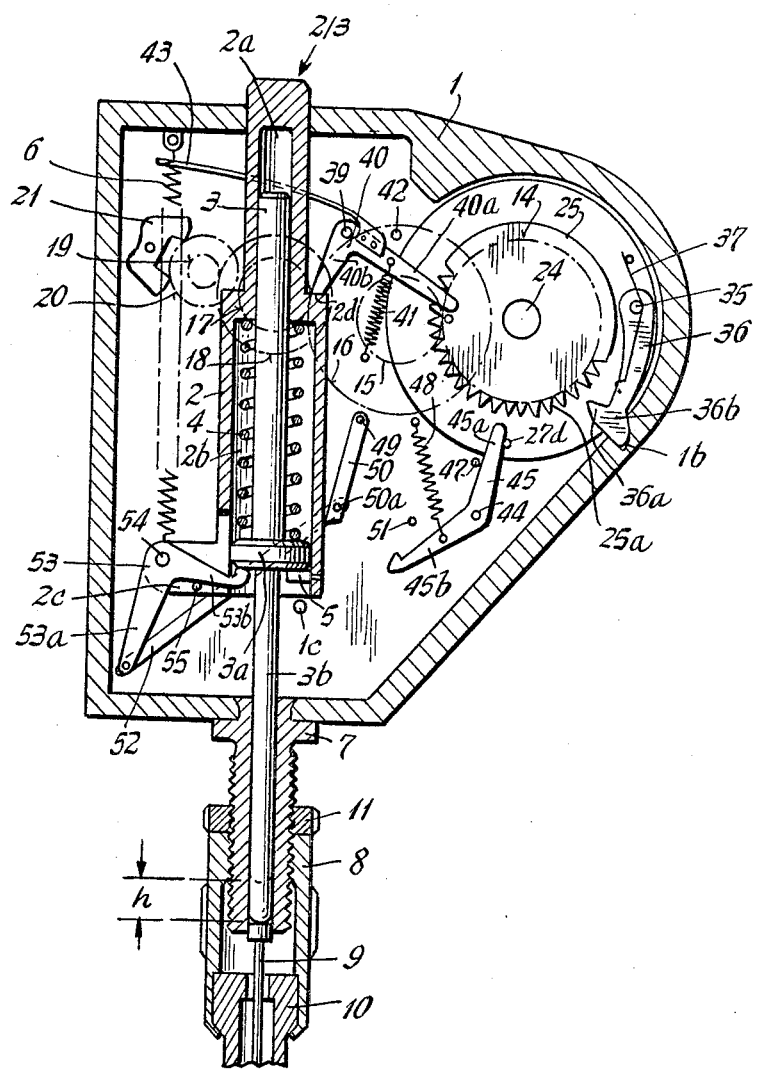
FIG. 6 shows the apparatus after the time delay has expired and the shutter release has reached its end position, and the extra-long exposure mechanism has been released for running down.

If the device as shown in FIGS. 4 to 6 is to operate the camera in such a way that the shutter is not opened until after a predetermined time delay and is then held open for an extra-long exposure of controlled duration, it is necessary to preselect, by means of the setting knob 26, the desired extra-long exposure time and to set by means of the setting ring 27 the period of delay before the exposure begins. The length of the delay is indicated by the point on the setting scale 27b that is brought opposite the fixed mark 33. Because of the coupling effect of the pawl 36 during this process, the disc 25 and the knob 26 are rotated simultaneously with the rotation of the setting ring 27. This maintains the relative position of the setting members, and simultaneously the spiral spring 31 is wound up according to the additional rotation of the setting ring 27. The rotary motion of the ring 27 also causes the driving pin 27d (as shown in FIG. 4) to move away from the arm 45a. This makes it possible for the lever 45 to rotate clockwise under the pressure of the spring 48. During this process the hook at the end of the arm 45b catches the link 50 and locks the 4-membered joint 50, 52 and 53.

If the release push rod 2 and 3 is depressed as shown in FIG. 5, the locking of the 4-membered joint causes the rod 52 to pivot about the pin 50a by which it is articulately connected to the link 50. Due to the resulting relative displacement of the pivoting axis 54 of the lever 53 with respect to the pin 50a, the angle lever 53 will be rotated about its pivot pin 54 from the position shown in FIG. 1 so as to cause the arm 53b that engages the flange 3a to compress the spring 4. At the end of the travel of the shutter release 2 and 3, the arm 40b is able to engage the shoulder 2d of the slide 2 as described above, and to release the mechanism 14 to 21 for running down, but is not able to actuate the shutter of the camera. The shutter is actuated only when, in the course of the running down motion of the mechanism 14 to 21, the driving pin 27d strikes the arm 45a and unlocks the 4-membered joint 50, 52 and 53. Because of this process, the energy stored in the spring 4 is suddenly released to push the pin 3 downwardly corresponding to the reduced distance "h" indicated in FIG. 6 to bring about the actuation of the camera shutter.

The arrangement of the coupling pawl 36 on the setting ring 27 is such that the pawl is removed from engagement with the coupling disc 25 when the cam 36b enters the recess 1b, simultaneously with the release of the 4-membered joint 50, 52 and 53. The setting ring 27 now reaches its starting position while the coupling disc 25 and the setting knob 26 continue their rotary motion under the force of the spring 31. As has already been stated, at the end of the rotary motion of the disc 25, the driving pin 25b strikes the arm 40a of the arresting lever 40 and rotates this lever counterclockwise, permitting the shutter release 2 and 3 to return to its starting position under the force of the restoring spring 6, thereby indicating that the exposure process has terminated.

When used as a delayed action device

When it is desired to use the apparatus only to delay the operation of the shutter after the shutter release has been actuated, all that is necessary is to rotate the ring 27 so that the desired time delay is indicated opposite the fixed mark 33. Since the rotary motion of the setting ring 27 also causes the coupling pawl 36 to be pulled out of the recess 1b, a non-rotatable connection is immediately established between the two members 26 and 27 and, therefore, both of these members take part in the setting motion. This causes the support on the driving pin 25b and 27d to be removed from the two arresting levers 40 and 45. The arm 40b thereupon engages the slide 2 and the arm 45b engages the link 50. If the shutter release 2 and 3 is depressed after the delayed action mechanism has been set, the arm 40b engages the shoulder 2d of the slide 2 and simultaneously releases the running mechanism 14 to 21 for running down by lifting the resilient blade 43 away from the escapement anchor 21. At the end of the running down motion, the 4-membered joint 50, 52 and 53 is unlocked by the driving pin 27d which strikes the arm 45a. This causes the shutter of the camera to be operated simultaneously. The arresting lever 40 is actuated by the driving pin 25b which frees the shutter release 2 and 3 and permits it to return to its starting position under the force of the restoring pin 6.

Figure 7:
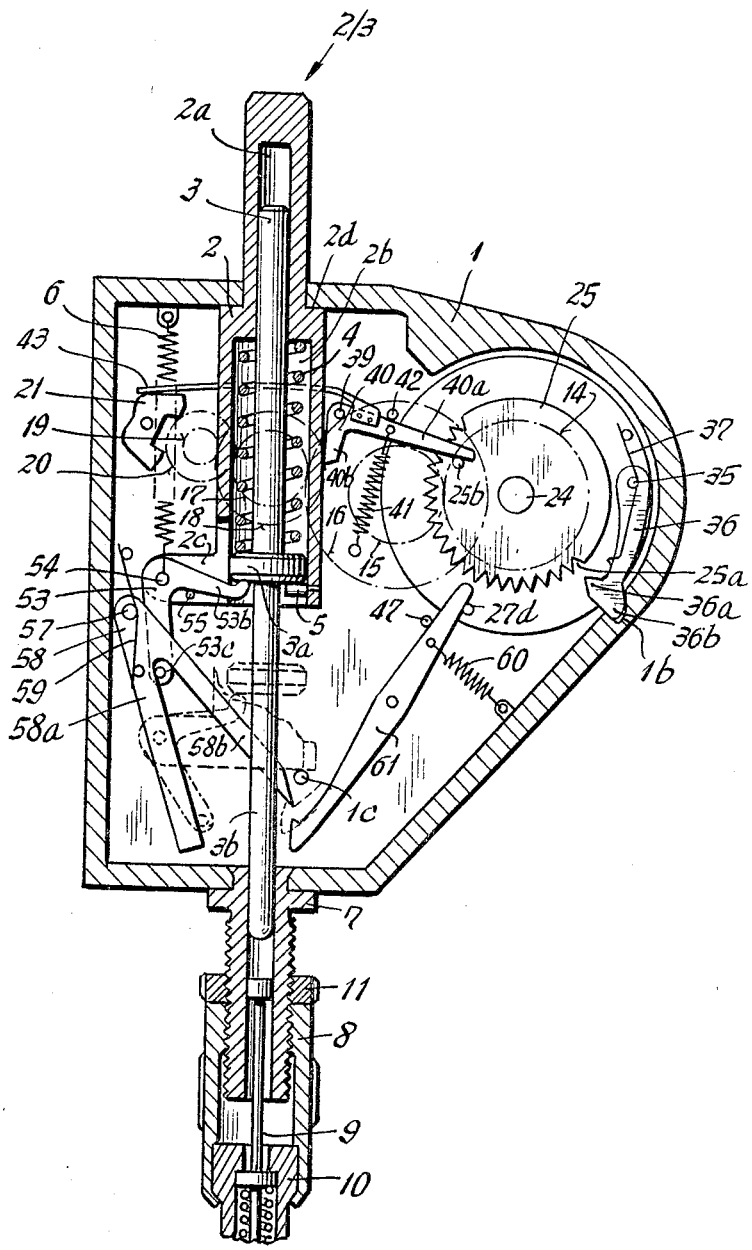
FIG. 7 shows another embodiment of the invention in which a lever having a slideway, or slot, is provided for the operative connection of the shutter release with the gears of the setting member.

According to the other embodiment, which is illustrated in FIG. 7 and which substantially corresponds to the above-described arrangement as regards structure and method of operation, and is therefore labeled with the same reference numerals, the 4-membered joint may be replaced with a positive guide in the form of a lever 58 pivotally mounted on a fixed pin 57 to cooperate with the angle lever 53. The lever 58 is provided with a rectilinear slideway, or slot, 58a, is influenced by a spiral spring 59 that tends to keep this lever constantly in engagement with a sensing pin 53c of the lever 53. The lever 58 has an arm 58b for the purpose of being locked by an arresting lever 61 which corresponds to the arresting lever 45 of the embodiment of FIGS. 1–6. The lever 61 is resiliently biased by a spring 60.

If the shutter release trigger 2 and 3 in the apparatus of FIG. 7 is actuated, the sensing pin 53c acts on the lever 58 to push it laterally away while the sensing pin slides along the surface of the slideway 58a, assuming that the arm 58b is not locked by the locking lever 61. However, if the arm 58b is locked, the slideway 58a produces a moment of rotation of the angle lever 53, which moves the pin 3 counter to the direction of pressure, thereby compressing the spring 4. The unlocking of the lever 58 is effected in the same manner as that of the 4-membered joint 50, 52 and 53 in the embodiment of FIGS. 1–6. As in the earlier embodiment, the driving pin 27d strikes the lever 61 and pulls it away from the engagement with the arm 58b, to interlock the lever 58.

What is claimed is:

1. A shutter release actuating apparatus comprising a shutter release slide; a pin elastically connected to said slide and movable into operative engagement with said shutter release; a running mechanism; a first setting mechanism to set said running mechanism for a first time duration; a first locking device alternately locking said running mechanism and slide to hold said slide depressed for said first time duration; a second locking device operatively connected to said pin and comprising an arresting lever movable between a locked position and an unlocked position; a driving spring; a cocking shaft connected to said driving spring to stress the same; and a second setting device connected to said cocking shaft to move said shaft into a specific cocked position to set said running mechanism for a second time duration whereby said arresting lever is moved into its locked position, said arresting lever being moved into its unlocked position when said device returns to its starting position.

2. The apparatus of claim 1 comprising a spring by which said pin is elastically connected to said shutter release trigger; and a flange on said pin against which said spring abuts and by which said positive guide is operatively connected to said pin.

3. The apparatus of claim 2 in which said second locking device comprises a 4-membered joint comprising, in turn, a lever pivotally mounted on said shutter release slide and engaging said flange, a fixed pivot pin and a second lever pivotally mounted thereon, and a connecting rod articulately connected to both of said levers.

4. A shutter release actuating apparatus comprising a shutter release slide; a pin elastically connected to said slide and movable into operative engagement with said shutter release; a running mechanism; a first setting mechanism to set said running mechanism for a first time duration; a first locking device alternately locking said running mechanism and said slide to hold said slide depressed for said first time duration; a second locking device comprising a first lever having a slideway, and an angle lever pivotally mounted on said slide; an arresting lever for locking said first lever, said second locking device being operatively connected to said pin; a driving spring; a cocking shaft connected to said driving spring to stress the same; and a second setting device connected to said cocking shaft to move said shaft into a specific cocked position to set said running mechanism for a second time duration whereby said arresting lever is moved into its locked position, said arresting lever being moved into unlocked position when said second setting device returns to its starting position.

5. A shutter release actuating apparatus comprising a shutter release slide; a pin elastically connected to said slide and movable into operative engagement with said shutter release; a running mechanism comprising a ratchet wheel and an escapement anchor; a first setting mechanism to set said running mechanism for a first time duration; a first locking device comprising an angle lever having first and second arms, and a spring blade attached to lever, said lever being movable between a first position in which said one arm locks said slide and a second position in which said one arm is away from said slide, said blade engaging said anchor when said lever is in said second position to lock said running mechanism, said blade being removed from said anchor when said lever is in said first position; a second locking device operatively connected to said pin and comprising an arresting lever movable between a locked position and an unlocked position; a driving spring; a cocking shaft connected to said driving spring to stress the same; and a second setting device connected to said cocking shaft to move said shaft into a specific cocked position to set said running mechanism for a second time duration whereby said arresting lever is moved into its locked position, said arresting lever being moved into its unlocked position when said second setting device returns to its starting position, said second setting device engaging said second arm of said angle lever to move said angle lever into said second position.

6. A shutter release actuating apparatus comprising a shutter release slide; a pin elastically connected to said slide and movable into operative engagement with said shutter release; a running mechanism; a driving spring for driving said running mechanism; a cocking shaft connected to said driving spring to stress the same; means connected to said cocking shaft to move said shaft to a specific cocked position, said means comprising a setting knob non-rotatably connected to said cocking shaft and a setting ring co-axial with said knob and rotatable with respect thereto, and means to couple said setting ring and said knob in different relative positions to set said running mechanism for a first time duration; a first locking device alternately locking said running mechanism and said slide for said first time duration; a positive guide operatively connected to said pin and comprising an arresting lever movable between an unlocked position and a locked position; and a second setting device comprising means associated with said first-named means to move said arresting lever between its unlocked and locked positions.

7. The apparatus of claim 6 in which said first named means comprises a coupling pawl pivotally mounted on said setting ring; a projection at the free end of said pawl extending in one direction; a cam at said free end of said pawl extending in the opposite direction; a housing for said apparatus, said housing having a recess into which said cam fits when said setting ring is in its starting position; a spring resiliently biasing said cam into said recess; and a coupling disc non-rotatably connected to said setting knob and having a plurality of notches in the periphery thereof to receive said projection.

8. The apparatus of claim 7 comprising a first driving pin connected to said setting knob to engage said first locking device; and a second driving pin operatively connected to said setting ring to engage said arresting lever and to move said arresting lever to its unlocked position.

9. A shutter release actuating apparatus comprising a shutter release slide; a pin elastically connected to said slide and movable into operative engagement with said shutter release; a running mechanism; a driving spring for driving said running mechanism; a cocking shaft connected to said driving spring to stress the same; means connected to said cocking shaft to move said shaft to a specific cocked position, said means comprising a setting knob non-rotatably connected to said cocking shaft and a setting ring co-axial with said knob and rotatable with respect thereto to set said running mechanism for a first time duration, and means to couple said setting ring and said knob in different relative positions; first and second setting scales on opposite peripheral sides of said setting ring starting with a common origin "0" and extending in opposite directions of an angular range of approximately 180°; a fixed mark cooperating with one of said scales to indicate said first time duration the rotation of said ring; a second mark on said setting knob to cooperate with the other of said scales to indicate a second time duration; a first locking device alternately locking said running mechanism and said slide for said first time duration; a positive guide operatively connected to said pin and comprising an arresting lever movable between an unlocked position and a locked position; and means associated with said first-named means to move said arresting lever between its unlocked and locked positions.

10. The apparatus of claim 9 comprising a frictional connection between said cocking shaft and said running mechanism.

References Cited by the Examiner
UNITED STATES PATENTS
3,154,951   11/1964   Vuillumier _____ 95—53.6 X FOREIGN PATENTS
340,207   9/1921   Germany.

JOHN M. HORAN, *Primary Examiner.*